April 15, 1958     S. J. GENSINGER ET AL     2,830,829
FOLDABLE TOWING MECHANISM
Filed May 17, 1955                      2 Sheets-Sheet 1

INVENTORS
STEPHEN J. GENSINGER
and HARRY T. BARWEL
BY

Howard P. King
ATTORNEY.

April 15, 1958 S. J. GENSINGER ET AL 2,830,829
FOLDABLE TOWING MECHANISM
Filed May 17, 1955 2 Sheets-Sheet 2
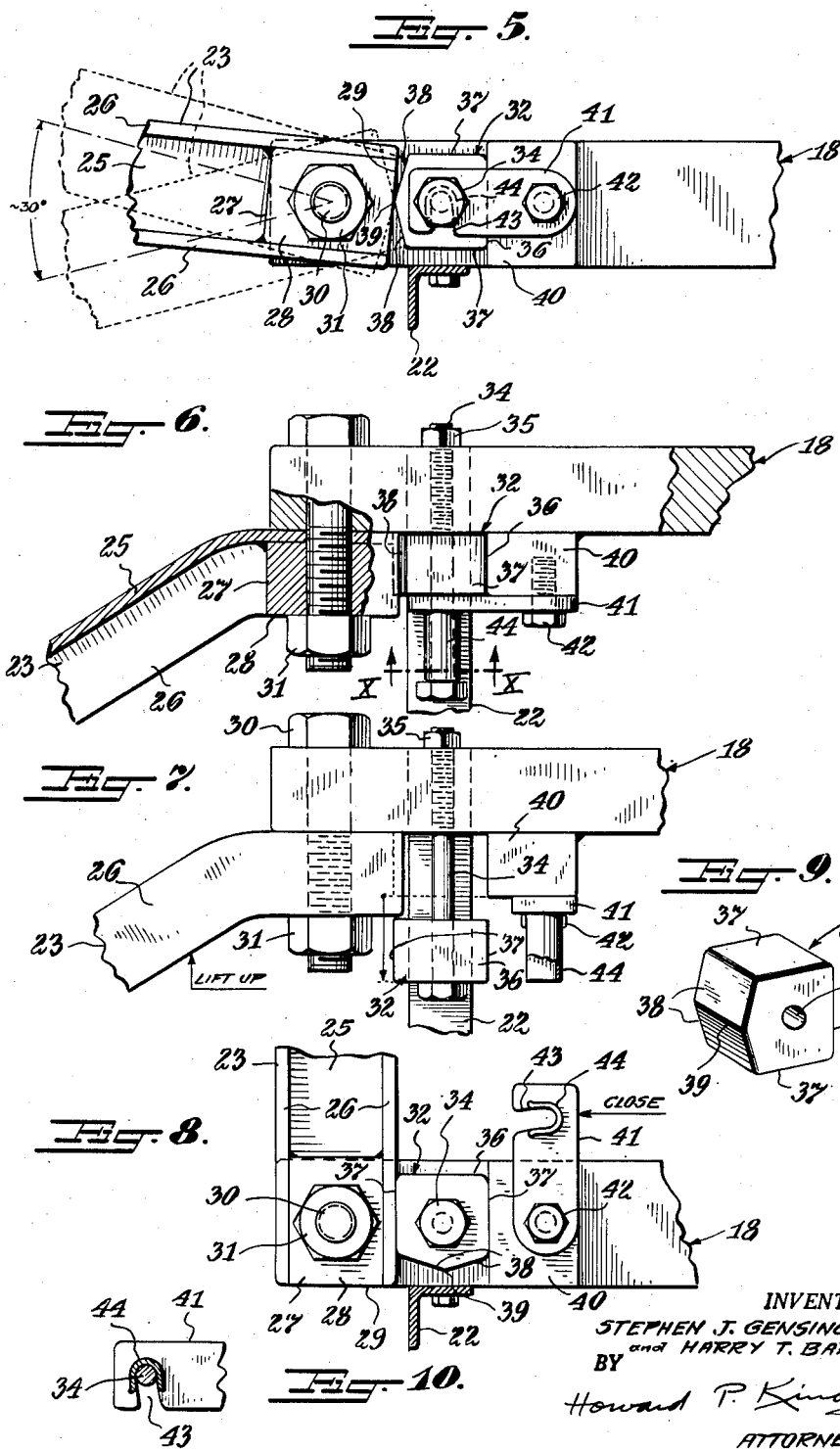
INVENTORS
STEPHEN J. GENSINGER
and HARRY T. BARWELL
BY
Howard P. King
ATTORNEY though the laws of many States prohibit towing one car by another unless the towed car is of certain proportionate less weight than the towing car (since the brakes of the towing car have to function for both) the use of cars by an attendant has not been heretofore generally possible. However, with the advent of small light cars, of which the "Renault" is an example, a differential of weight satisfying to the law is attained, and such cars may be used by an attendant calling for and delivering practically all of the popular makes of pleasure vehicles in present use.

United States Patent Office 2,830,829
Patented Apr. 15, 1958

2,830,829
FOLDABLE TOWING MECHANISM

Stephen J. Gensinger, Clifton, and Harry T. Barwell, Paterson, N. J.

Application May 17, 1955, Serial No. 508,839

8 Claims. (Cl. 280—491)

This invention relates to towing mechanism, and more particularly to an assembly permanently attached to a motor vehicle for enabling that vehicle to be attached to and towed by another.

Under practice that has developed in the past years of garages, service stations and the like calling for and delivering motor vehicles of customers, the attendant usually has used a motor-cycle to go to or from the place of call, and has hitched the cycle to the car for the trip in the opposite direction. Insurance rates are very high for this type of service using motor cycles, based upon the fact that many accidents have occurred in this practice. Furthermore, with a motor-cycle, the attendant is subjected to all kinds of weather conditions and is unprotected from inclement weather. It is far preferable to use a four-wheel motor vehicle in the performance of this service, but since the laws of many States prohibit towing one car by another unless the towed car is of certain proportionate less weight than the towing car (since the brakes of the towing car have to function for both) the use of cars by an attendant has not been heretofore generally possible. However, with the advent of small light cars, of which the "Renault" is an example, a differential of weight satisfying to the law is attained, and such cars may be used by an attendant calling for and delivering practically all of the popular makes of pleasure vehicles in present use.

In its broad aspect, the present invention proposes towing mechanism by which a small car may be towed by a larger one.

Furthermore, the invention contemplates the retention of the towing mechanism as a permanent part of the service car.

More specifically, an object of the invention is provision of a foldable towing mechanism which is readily put into service.

A further object of the invention is to provide a towing mechanism which, while foldable when desired, is prevented from folding while in towing service.

Another object of the invention is to maintain the towing mechanism from ever swinging downward while the vehicle to which it is attached is moving, far enough to contact the ground.

Yet other objects of the invention are to secure a structure which is simple in manipulation and to obtain a device that is sturdy and dependable, and to include safety factors to eliminate all possible hazards of car towing.

Other objects, advantages and novel features of construction will appear to persons skilled in the art to which the invention appertains as the description proceeds, both by direct recitation thereof and by implication from the context.

Referring to the accompanying drawings, in which like numerals of reference indicate similar parts throughout the several views;

Figure 1 is a plan view of the towing mechanism of this invention, showing the same as mounted on the service car and hitched to a bumper, representative of the customer's vehicle;

Figure 2 is a side elevation of Fig. 1;

Figure 3 is a plan view view of the towing mechanism and showing the hitch in its idle position;

Figure 4 is a side elevation, showing the towing mechanism in its folded condition;

Figure 5 is a sectional view on line V—V of Fig. 1;

Figure 6 is a plan of Fig. 5, with parts in section;

Figure 7 is a plan similar to Fig. 6, but showing tow-bar released for swinging the same;

Figure 8 is an elevational section similar to Fig. 5, but showing the tow-bar swung and held upward in its non-towing or folded position;

Figure 9 is a perspective view of a shiftable dog or tow-bar detainer; and

Figure 10 is a sectional view on line X—X of Fig. 6 showing the latch for said dog or detainer in closed or holding position.

In the specific embodiment of the invention illustrated in said drawing, the reference numeral 15 designates the rear bumper of a usual construction of automobile which an attendant may be driving while towing his service vehicle 16. It may be appropriate to here mention that said service vehicle adopted for utilization in conjunction with the present invention is preferably a small, light-weight car the wheel-base of which is not as wide as the standard wheel-base of the popular makes of pleasure vehicles, but of course is motor driven and otherwise constitutes a complete automobile with protection for the driver thereof against the inclemencies of the weather. As this service vehicle is proportionately very much lighter in weight than the popular make of pleasure vehicle, it is both very readily towed and comes within the requirements of the law regulating the towing of one vehicle by another. The front end of said service vehicle has a rigid portion, such as a frame 17 to which the towing mechanism of this invention is attached.

Broadly considered, the towing mechanism consists of a fixed mount 18, a hinged tow-bar 19 at the front of said mount, and a hitch 20 at the front of the tow-bar. The fixed mount here shown is made up of two strong and rigid shanks 21 which are bolted or otherwise secured to the service vehicle frame 17 and project horizontally therefrom forwardly of the vehicle. Near the forward ends of said shanks is a tie-bar 22 extending horizontally across from one shank to the other, bracing said shanks and maintaining constant spacing one from the other. Said tie-bar is located at the under faces of said shanks and also functions as a protection for hereinafter described swing-limiting elements for the tow-bar.

According to the selected showing herein of tow-bar, the same is conveniently comprised of two side rails 23, which, in towing position, converge forwardly to and are integral with a cross-head 24. Said side rails and cross-head are channel shaped with the channel webs 25 at the outer sides thereof and the channel flanges 26 extending inwardly. The divergent ends of the channels are bent into parallelism to each other and to the shanks of the fixed mount, overlapping the forward end portions of said shanks and with the webs 25 thereat juxtaposed in flatwise engagement with the inwardly facing sides of said shanks. Preferably a filler block 27 is welded within said parallel ends of the channels, one in each. These filler blocks provide flat faces 28 in planes common with the inwardly directed edges of the channel flanges, and other flat faces 29 in planes common with the rear end edges of the webs and flanges.

Axially aligned bolts 30, or other suitable pivotal means, extend through the overlapping portions of the tow-bar ends and the respective mounting shanks juxtaposed thereto. Said bolts have their heads at the outer sides of the shanks and have their threaded portions screwed into and through the filler blocks and held securely by lock nuts 31 next to the said inwardly directed flat faces 28 of said blocks. The bolts are thus fixed with respect to the blocks and can rotate where passing through the mounting shanks and thus constitute horizontally aligned pivots or hinges upon which the tow-bar may be swung up or down in front of the service vehicle. Thus in Figures 1, 2 and 5 the tow-bar is shown extending approximately horizontally forwardly, whereas in Figures 4 and 8 it is shown swung to substantially vertical position.

It is a feature of the present invention to provide an interlock or swing-limiting element effective on the tow-bar when located in either of the above-mentioned positions of extending forwardly or upwardly. Said interlock or element is depicted herein as a chock 32 movably supported by the mount 18 and engageable against the rear of the tow-bar in either of said positions of the tow-bar. The chock 32 has a central hole 33 therethrough and extending therethrough is a bolt 34 which threads into the mount 18 and made secure therein by a lock-nut 35. The bolt projects from the mount in parallelism to the pivotal bolts 30 for the tow-bar, and the projecting length of said bolt 34 to the head thereof is greater than the combined thickness of the chock 32 and the tow-bar channel. By this arrangement, the chock can be slid on its bolt 34 to a position clearing the tow-bar channel thereby enabling the tow-bar to be swung without interference by said chock, as shown in Fig. 7.

The chock 32 has what may be termed a basal face 36 parallel to the axis of hole 33 and two side faces 37, 37 perpendicular to and intersecting said basal face, said side faces being parallel to each other and on opposite sides of said chock from said hole. The fourth face of the chock, on the opposite side of the hole from said basal face, is comprised of two facets 38, 38 which taper from a medial peak 39 toward and intersect said two side faces 37, 37. The perpendicular distance of said peak 39, which parallels the axis of said hole, and the perpendicular distances of the basal face 36 and of the side faces 37, 37 to the axis of said hole 33 are all equal to each other, for selective utilization of the several faces for chocking purposes. It is now appropriate to state that the outside face of the upper flange 26 of the tow-bar channel and the end edge of the channel together with the end face of the filler block, are each equidistant from the axis of the pivot bolt 30 therefor, and that the perpendicular distance from the axis of that pivot bolt 30 to the axis of bolt 34 on which the chock 32 is carried, is equal to the sum of, for instance, the distance from bolt 30 axis to end face of the filler block plus the distance from bolt 34 axis to peak 39 of the chock. This likewise results in the distance between the bolt axes being equal to the sum of the distance from the axis of pivot bolt 30 to the outer side of the channel plus the distance from the axis of the chock bolt to either side face of the chock 32.

By virtue of the construction so far described, the chock can be slid on its bolt 34 to proximity to the head of that bolt so that the chock will clear the tow-bar and permit said tow-bar to be swung to desired location. If the tow-bar is desired to be put into service for towing the service car, it is swung to its approximately horizontal position. The chock 32 is rotated on its bolt 34 so as to cause the facets 38, 38 to be directed forwardly, and then the chock is slid to position behind the end of the tow-bar channel and filler block. The angularity of the facets permits a limited swing of the tow-bar for towing purposes, as indicated by the extreme positions in the dotted line representations of the tow-bar in Fig. 5. The arbitrarily selected limitation of swing imposed by said facets upon the tow-bar is indicated in Fig. 5 as 30° of which 15° is above horizontal and 15° is below horizontal, but the invention is not confined to these exact amounts. Suffice it to say that the downward limitation of swing should be such that the forward end of the tow-bar cannot reach the ground, and limitation in either direction is adequate to prevent the service car from riding into the car ahead to which it is attached by said tow-bar.

Alternatively, when the service car is not being towed, the tow-bar is to be swung upward to vertical position as shown in Figs. 4 and 8, and to effect this change of position of the tow-bar, the chock 32 is slid on its bolt 34 out to the head thereof and rotated to a position where one side face 37 of the chock is directed forwardly. The tow-bar is free to be swung upward to vertical position while the chock is thus withdrawn, and thereafter the chock is slid back to its position behind the tow-bar channel, at which time the forwardly directed face 37 of the chock will engage against the rearward face of the channel and thereby lock the tow-bar in its upright position where it has to remain until the chock is again released from engagement therewith.

It will be appreciated that considerable lateral displacing force is applied by the tow-bar against the chock 32, and in order to prevent that strain from being communicated to the supporting bolt 34 through the chock, an abutment 40 is provided on the fixed mount 18 at the rear of and for engagement by said chock. Consequently, when the chock 32 is slid home for limiting swing of the tow-bar, it is interposed between and in engagement with both the tow-bar and with said abutment. While in the present showing said abutment is indicated as being welded to mount 18, other modes of attaching the same in place may be employed.

Retention of the chock 32 in its location behind the tow-bar until intentionally released is important, and means for accomplishing this desideratum is here illustrated as comprising a latch 41 pivoted near one end thereof on a stud bolt 42 screwed into the face of said abutment remote from and parallel to the mounting 18. That face of the abutment and the corresponding inwardly directed end face of the chock lie in a common vertical plane when the chock is slid home to its holding position, thereby enabling the latch to swing downward across both of said faces and thereby retain said chock in that holding position. The under edge of the latch 41 has a notch 43 to nest over the chock-supporting bolt 34 when the latch is swung down to holding position. If so desired, a partial collar 44, longitudinally open at its under side may be provided on the latch projecting laterally from said latch and parallel to the chock-supporting bolt 34 and in proper position and having suitable length to nest onto said bolt and extend from the latch to the head of said bolt both to keep the bolt clean and protected and to keep the latch from being bent laterally away from the chock.

While the foregoing description of the constituent parts of the swing-limiting element constituted by said chock 32 and its associated parts, has for simplicity and definiteness referred to the same in the singular, it is to be understood that a duplicate thereof is provided at the other side of the tow-bar on the other mounting shank 18. Therefore both sides of the tow-bar are held, and in order to change the swung location of the tow-bar, the latches 41 ad chocks 32 at both sides of the tow-bar have to be correspondingly manipulated.

Inasmuch as it is preferred to use a service car having a narrower wheel-base than the usual pleasure car, the convergence of side rails 23 of the tow-bar 19 is non-symmetrical, the side rail 23 toward the right side of the car having greater slope than the rail 23 toward the left side. This enables the hitch 20 to be attached substantially midway of the length of the towing car bumper 15 with the right-hand sides of the vehicles approximately aligned, but with the left-hand side of the service vehicle further toward the right than the left-hand side of the towing vehicle. This will both give the driver of the towing vehicle better rear view of overtaking vehicles, and will give the driver of an overtaking vehicle better vision of the towing and towed vehicles and enable him to more readily and safely pass the same.

The hitch 20 here shown is one available on the market, and exemplifies the essentials of a suitable hitch for the purpose of the present invention. Basically, said hitch has a stanchion 45 secured to and upstanding from crosshead 24 of the tow-bar. An arm 46 is rotatively attached to the stanchion, and the other end of said arm provides a universal connection to a body 47 which in turn carries adjustable jaws 48, 49 for gripping the bumper 15 of the towing car. One of these jaws, as 49 has a screw shank 50 and hand-operable nut 51 for applying the gripping tension. One side-rail 23 of the tow-bar has a fixed bracket 52 thereon in appropriate position to be engaged by body 47 and jaw 49 in condition of non-use of the hitch to keep the hitch from flopping around when the service car is being independently driven.

We claim:

1. Towing mechanism comprising a mount for attachment to a service vehicle, a tow-bar having a rear end portion lapping at a side of said mount, a pivot attaching said lapping end portion to said mount, said end portion having a transverse face perpendicular to the mount and parallel to said pivot, a chock carried by said mount, and mounting means for said chock providing a limited range of movement of the chock into and out of juxtaposition to said transverse face, said chock having faces selectively engageable with said transverse face of the tow-bar when the chock is juxtaposed to said transverse face with the tow-bar at different pivoted positions, thereby constituting an interlock between said mount and tow-bar for selectively limiting desired pivotal relation therebetween.

2. Towing mechanism comprising a mount for attachment to a service vehicle, a tow-bar having a rear end portion lapping at a side of said mount, a pivot attaching said lapping end portion to said mount, said end portion having a transverse face perpendicular to the mount and parallel to said pivot, a chock carried by said mount, and mounting means for said chock providing a limited range of movement of the chock into and out of juxtaposition to said transverse face, said chock having two faces selectively engageable with said transverse face of the tow-bar when the chock is juxtaposed to said transverse face with the tow-bar at different pivoted positions, said two faces being disposed at an obtuse angle to each other and intersect adjacent said transverse face of the tow-bar when the chock is juxtaposed to said transverse face and the tow-bar is in towing position, whereby the tow-bar has a latitude of swing from engagement of its said transverse face from one to the other of said two faces of the chock.

3. Towing mechanism comprising a mount for attachment to a service vehicle, a tow-bar having a rear end portion lapping at a side of said mount, a pivot attaching said lapping end portion to said mount, said end portion having transverse faces perpendicular to each other and to the mount and parallel to said pivot, a chock carried by said mount, said chock having a plurality of faces, means mounting said chock for movement into and out of juxtaposition to a selected one of said transverse faces and when moved out of juxtaposition thereto permitting said chock to be turned for presenting a different face of said plurality of faces to be in juxtaposition to a selected one of said transverse faces, and one of said plurality of faces when so turned and juxtaposed having closer relation to said tow-bar when in its non-towing position, thereby retaining said tow-bar in substantially fixed relation to said mount.

4. Towing mechanism comprising a mount for attachment to a service vehicle, a tow-bar having a rear end portion lapping at a side of said mount, a pivot attaching said lapping end portion to said mount, said end portion having a transverse face perpendicular to the mount and parallel to said pivot, a chock carried by said mount, and mounting means for said chock providing a limited range of movement of the chock into and out of juxtaposition to said tow-bar and when moved out of juxtaposition permitting the chock to be turned for presenting a different side thereof to be in juxtaposition to said tow-bar on return of the chock to its juxtaposed position, one of said sides having two faces disposed at an obtuse angle to each other and intersecting adjacent said tow-bar when said side with the two faces is returned to the juxtaposed position, whereby the tow-bar has a latitude of swing from one to the other of said two faces and with the tow-bar in towing position, said chock having a third face at a different side thereof adapted to be turned toward said tow-bar when the chock is moved out of juxtaposition to the tow-bar and returned into closer juxtaposition to said tow-bar than obtained by said two faces when in juxtaposition to the tow-bar, thereby retaining said tow-bar in substantially fixed relation to said mount.

5. Towing mechanism comprising a mount for attachment to a service vehicle, a tow-bar having a rear end portion lapping at a side of said mount, a pivot attaching said lapping end portion to said mount, an abutment behind and spaced from said tow-bar, a chock slidably insertable between said tow-bar and abutment and retractable therefrom, said chock being rotatable to either one of two positions while retracted from between said tow-bar and abutment and adapted to be slid into place between the tow-bar and abutment in either one of said rotated positions and being dimensioned so that when inserted while in one rotated position it permits limited movement of the tow-bar to swing on said mount and when rotated and inserted in its other position it retains said tow-bar in substantially fixed relation to said mount.

6. Towing mechanism in accordance with claim 5 wherein a latch is provided engageable with and for removably retaining said chock slid in its inserted position between said tow-bar and abutment.

7. Towing mechanism in accordance with claim 5 wherein a latch is provided engageable with and for removably retaining said chock slid in its inserted position between the tow-bar and abutment, said latch having a partial collar engageable over and for covering a portion of said chock supporting means when said latch is in its position engaging said chock.

8. Towing mechanism in accordance with claim 6, wherein said mount has a crosswise tie-bar underlying and thereby in protective association to said latch.

References Cited in the file of this patent

UNITED STATES PATENTS

| 119,944 | Oat | Oct. 17, 1871 |
| 1,423,084 | Cotton | July 18, 1922 |
| 2,378,504 | Roos | June 19, 1945 |

FOREIGN PATENTS

| 298,437 | Germany | Sept. 22, 1915 |